United States Patent
Huang et al.

(10) Patent No.: US 6,655,985 B2
(45) Date of Patent: Dec. 2, 2003

(54) INPUT APPARATUS COOPERATING WITH ELECTRICAL DEVICE

(75) Inventors: Mao-Sung Huang, Taoyuan (TW); Chin-Chen Li, Hsinchuang (TW); Jian-Ying Liao, Shiluo Jen (TW)

(73) Assignee: Darfon Electronics Corp., Taoyuan (TW)

(*) Notice: Subject to any disclaimer, the term of this patent is extended or adjusted under 35 U.S.C. 154(b) by 0 days.

(21) Appl. No.: 10/233,723

(22) Filed: Sep. 3, 2002

(65) Prior Publication Data

US 2003/0045169 A1 Mar. 6, 2003

(30) Foreign Application Priority Data

Sep. 5, 2001 (TW) .......................................... 90121962 A

(51) Int. Cl.[7] .............................................. H01R 13/60
(52) U.S. Cl. ........................ 439/533; 439/929; 361/686
(58) Field of Search ................................ 439/533, 929; 361/686; 320/2

(56) References Cited

U.S. PATENT DOCUMENTS

| | | | | |
|---|---|---|---|---|
| 5,052,943 A | * | 10/1991 | Davis .......................... | 439/357 |
| 5,059,885 A | * | 10/1991 | Weiss et al. .................... | 320/2 |
| 6,364,697 B1 | * | 4/2002 | Tseng et al. ................. | 439/553 |
| 6,480,378 B2 | * | 11/2002 | Chang ......................... | 361/686 |
| 2002/0163778 A1 | * | 11/2002 | Hazzard et al. .............. | 361/683 |
| 2003/0072133 A1 | * | 4/2003 | Chuang ....................... | 361/686 |

* cited by examiner

*Primary Examiner*—Hung V. Ngo
(74) *Attorney, Agent, or Firm*—Snell & Wilmer L.L.P.

(57) ABSTRACT

An input apparatus for holding and cooperating with electrical devices such as personal digital assistants (PDAs) having different sizes includes a housing, an input interface, and a cap. The housing includes a front plate, a bottom plate, and two side portions, and the cap is disposed between the two side portions. The cap and housing together form a first space to contain an electrical device with a smaller size when cap is positioned in a top position. Also, the cap may be moved to a bottom position to form a second space for containing an electrical device with a larger size.

13 Claims, 12 Drawing Sheets

INPUT APPARATUS COOPERATING WITH ELECTRICAL DEVICE

This application claims priority of Taiwan Patent Application Serial No. 090121962 filed on Sep. 5, 2001.

FIELD OF THE INVENTION

The present invention relates to an input apparatus for use with electrical and electronic devices.

BACKGROUND OF THE INVENTION

In past few years, the sales of personal digital assistants (PDA) have rapidly increased. The appearance and functionality of PDAs are two important features making these relatively new devices so popular.

Most PDAs are smaller and lighter than conventional computers, and are therefore convenient to carry and hold for portability. Additionally, PDAs typically have a large-scale monitor to allow the user to easily read displayed information.

Functionally, PDAs store large amounts of data that the user may systematically manage using built-in software. Frequently, the user can easily retrieve data or update via a personal computer. PDAs also frequently connect to the Internet to exchange information. In addition, PDAs provide additional functions, such as dictionaries, games, calendar managers, etc. that improve the efficiency of daily work.

Several issues relating to PDAs still exist, however, such as the input interface used to input data directly and manually. There are two kinds of input interfaces generally used by conventional PDAs. The first one is a digital tablet on the PDA display, and the other is a voice input sensor. Both input interfaces are convenient for inputting a small amount of data. However, they are generally unsuitable for inputting a large amount of data due to the inconvenience of entering large amounts of text on a non-standard interface. Moreover, the recognition accuracy of these input approaches is not perfect, occasionally leading to data entry errors.

Further, PDAs frequently need to connect and cooperate with additional functional modules such as global positioning systems (GPS), digital cameras, cellular phones, MP3 players, and the like. With the additional functional modules cooperating with PDA, the overall size of PDA increases thus limiting the convenience and expandability of most PDAs.

SUMMARY OF THE INVENTION

One aspect of various embodiments of the present invention provides an input apparatus for cooperating with an electrical device such as a PDA to input data.

Another aspect provides an input apparatus cooperating with electrical devices having different sizes.

A further aspect provides an input apparatus including a constraint device and corresponding release device to prevent the personal digital assistant and the input device from separation.

According to various embodiments, the input apparatus suitably includes a housing, an input interface, and a cap. The housing may include a front plate, a bottom plate, and two side portions, with the cap disposed between the two side portions. The cap and the housing together form a first space to contain an electrical device with a smaller size when the cap is positioned in a top position. Also, the cap may be moved to a bottom position to form a second space for containing an electrical device with a larger size.

The input interface can be disposed on the front plate. The input interface may be a keyboard, joystick, handwriting recognition device, digital plate, or the like.

Further embodiments of the input apparatus also include an interface having at least one connector for electrically connecting to the electrical device. The interface may also include a constraint device to prevent the input apparatus and the electrical device from separating. The input apparatus may further include a release device corresponding to the constraint device to release the constraint device.

BRIEF DESCRIPTION OF THE DRAWINGS

FIG. 3b depicts the back view of the embodiment shown in FIG. 3a;

FIG. 3c depicts the top view of the embodiment shown in FIG. 3a;

FIG. 3d depicts the bottom view of the embodiment shown in FIG. 3a;

FIG. 5a shows the front view of the embodiment shown in FIG. 4a;

FIG. 5b shows the back view of the embodiment shown in FIG. 4a;

FIG. 6b shows the back view of the embodiment shown in FIG. 6a; and

DETAILED DESCRIPTION OF EXEMPLARY EMBODIMENT

An exemplary input apparatus is suitably configured for selectively holding and cooperating with a first electrical device 31 or a second electrical device 32 which has a larger size than the first electrical device 31. Either first electrical device 31 or second electrical device 32 cooperate with the input apparatus such that data is inputted into the first electrical device 31 or the second electrical device 32 through the input apparatus. In this embodiment, the first electrical device 31 may be a personal digital assistant (PDA), and the second electrical device 32 may be a PDA wrapped with a jacket.

Figure 1:
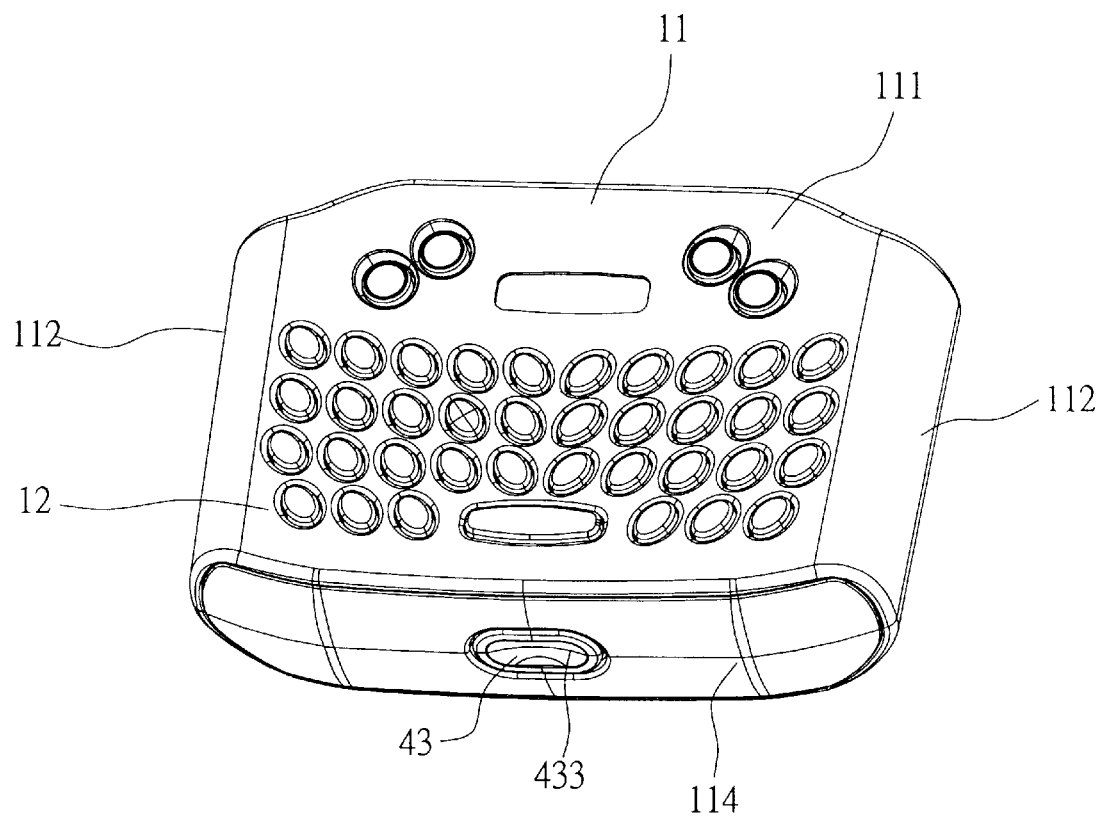
FIG. 1 depicts an exemplary embodiment of the present invention.
Figure 2A:
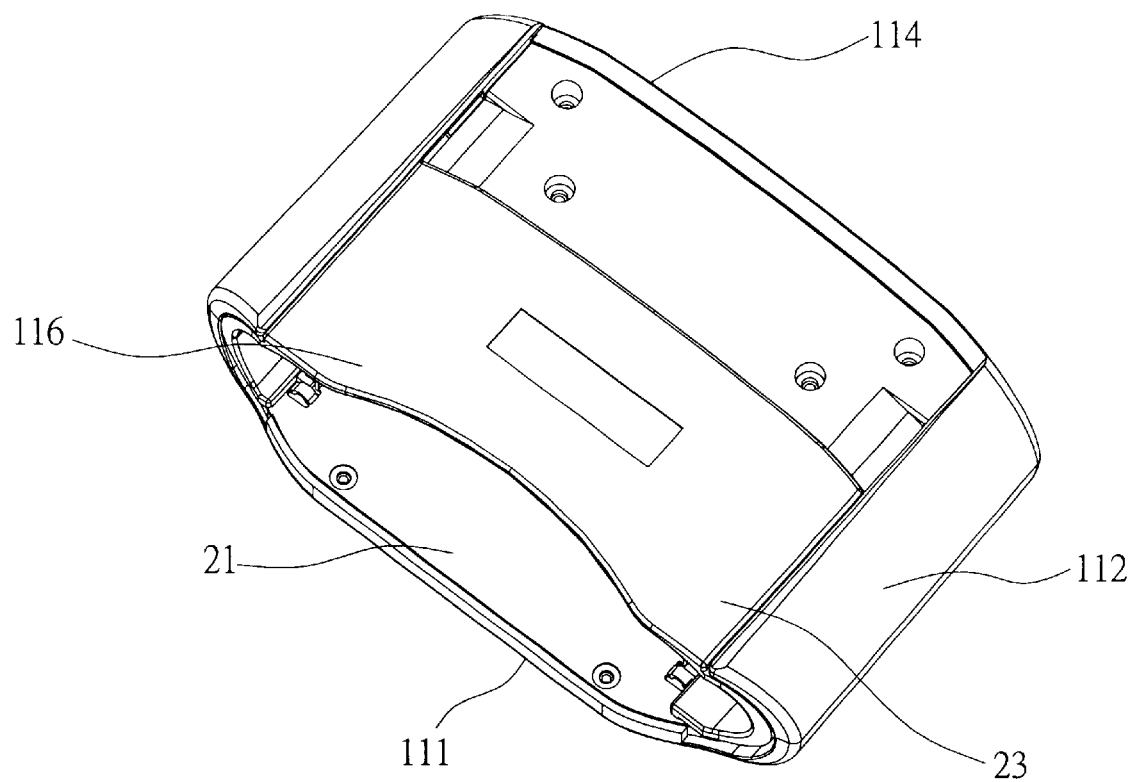
FIG. 2a depicts another view of the exemplary embodiment shown in FIG. 1 with the cap positioned in the top position.
Figure 3A:
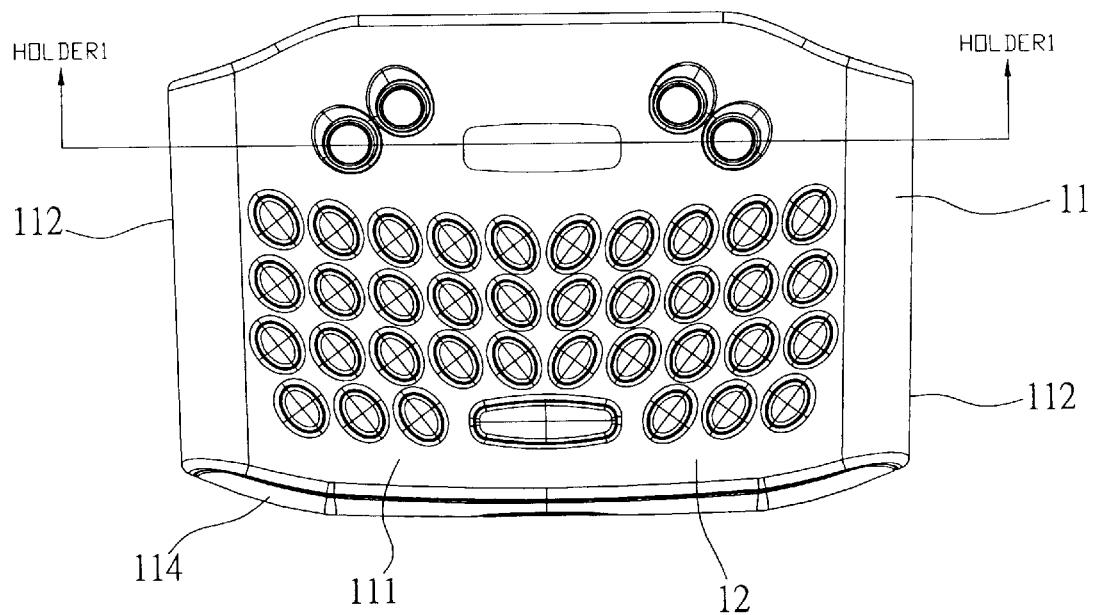
FIG. 3a depicts the front view of another exemplary embodiment of the present invention.
Figure 3B:
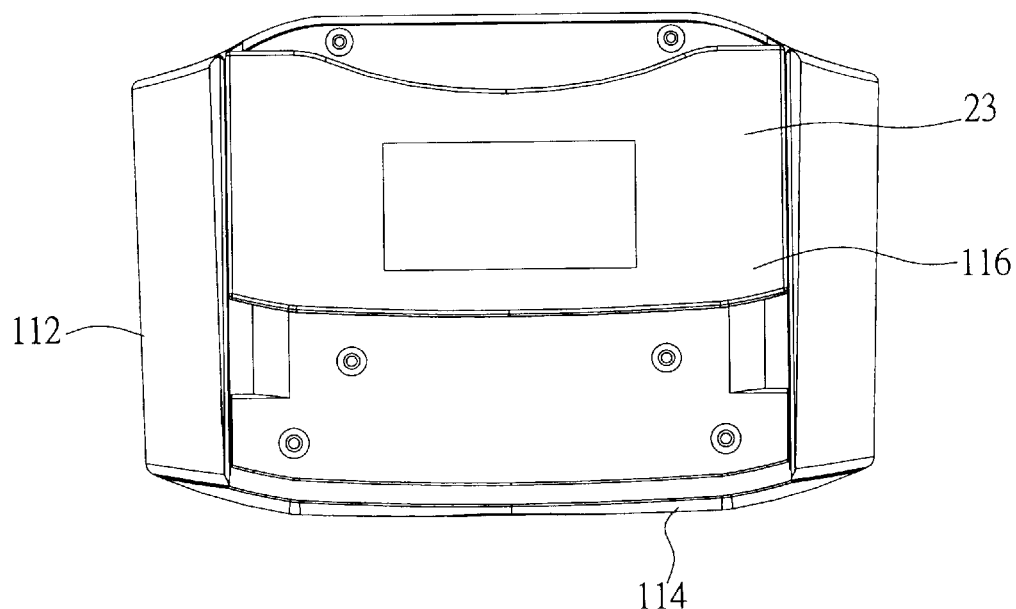
Figure 3C:
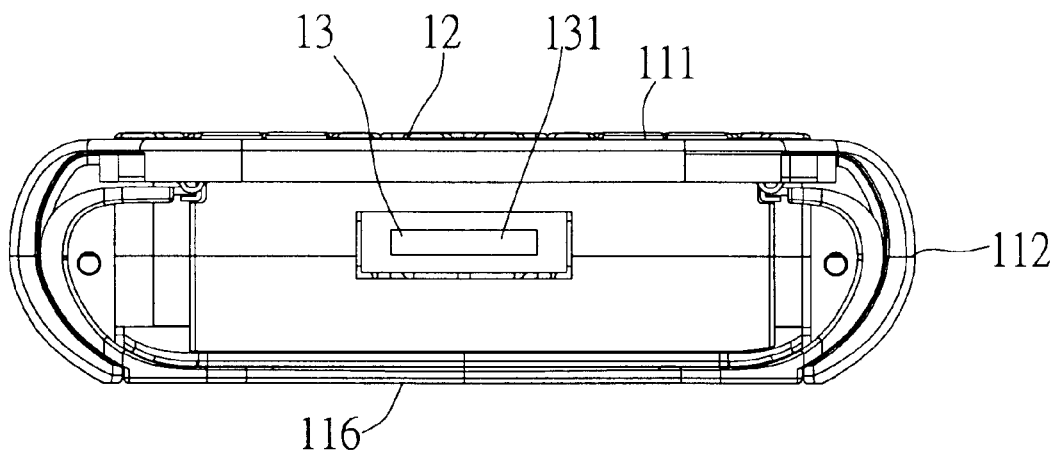
Figure 3D:
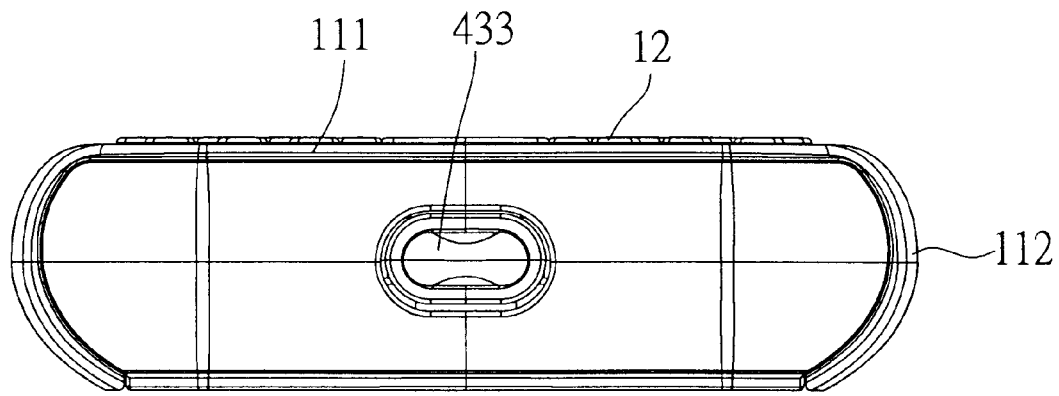

Referring now to FIGS. 1, 2a, and 3c, the input apparatus suitably includes a housing 11, an input interface 12, and a cap 116. Housing 11 may include a front plate 111, a bottom plate 114, and two side portions 112. Cap 116 is slidably disposed between two side portions 112, as appropriate. Housing 11 and cap 116 together form an opening and a first space 21 for containing a first electrical device 31 (such as a PDA) when cap 116 is positioned in a top position 23. As FIG. 2a shows, cap 116 remains in the top position 23 without movement when the first electrical device 31 is inserted into the first space 21, as shown in FIGS. 5a and 5b.

Figure 2B:
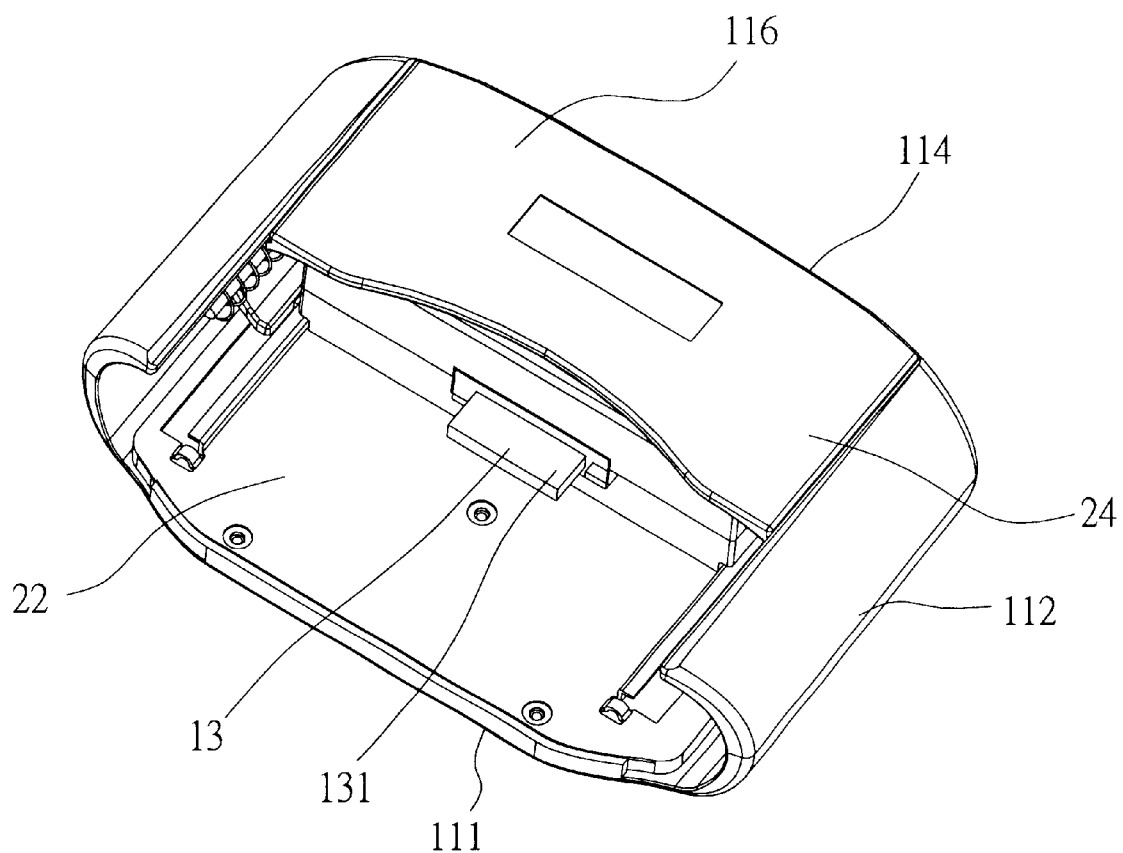
FIG. 2b depicts another view of the exemplary embodiment shown in FIG. 1 with the cap positioned in the bottom position.
Figure 6A:
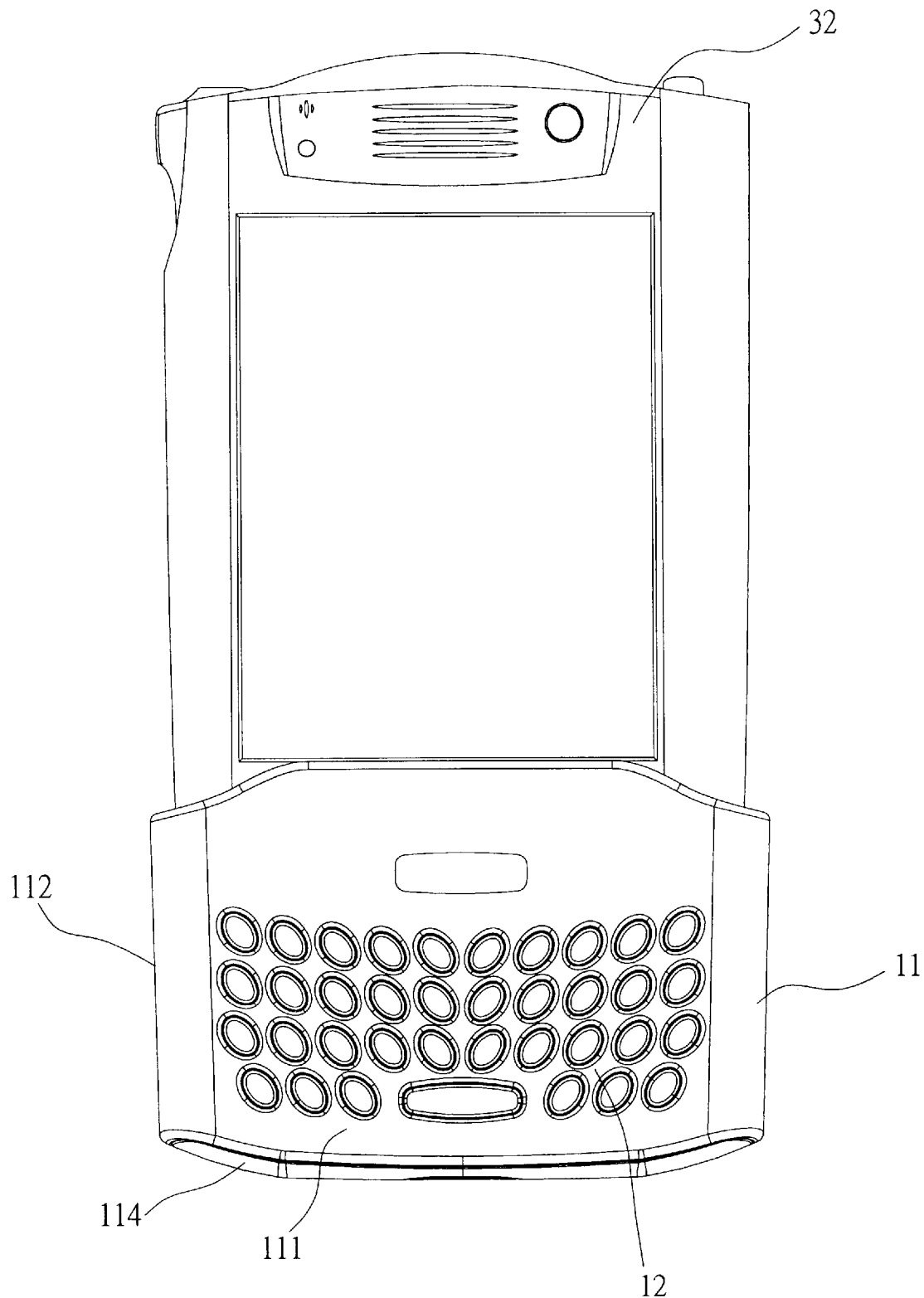
FIG. 6a shows the front view of an exemplary input apparatus holding the second electrical device.
Figure 6B:
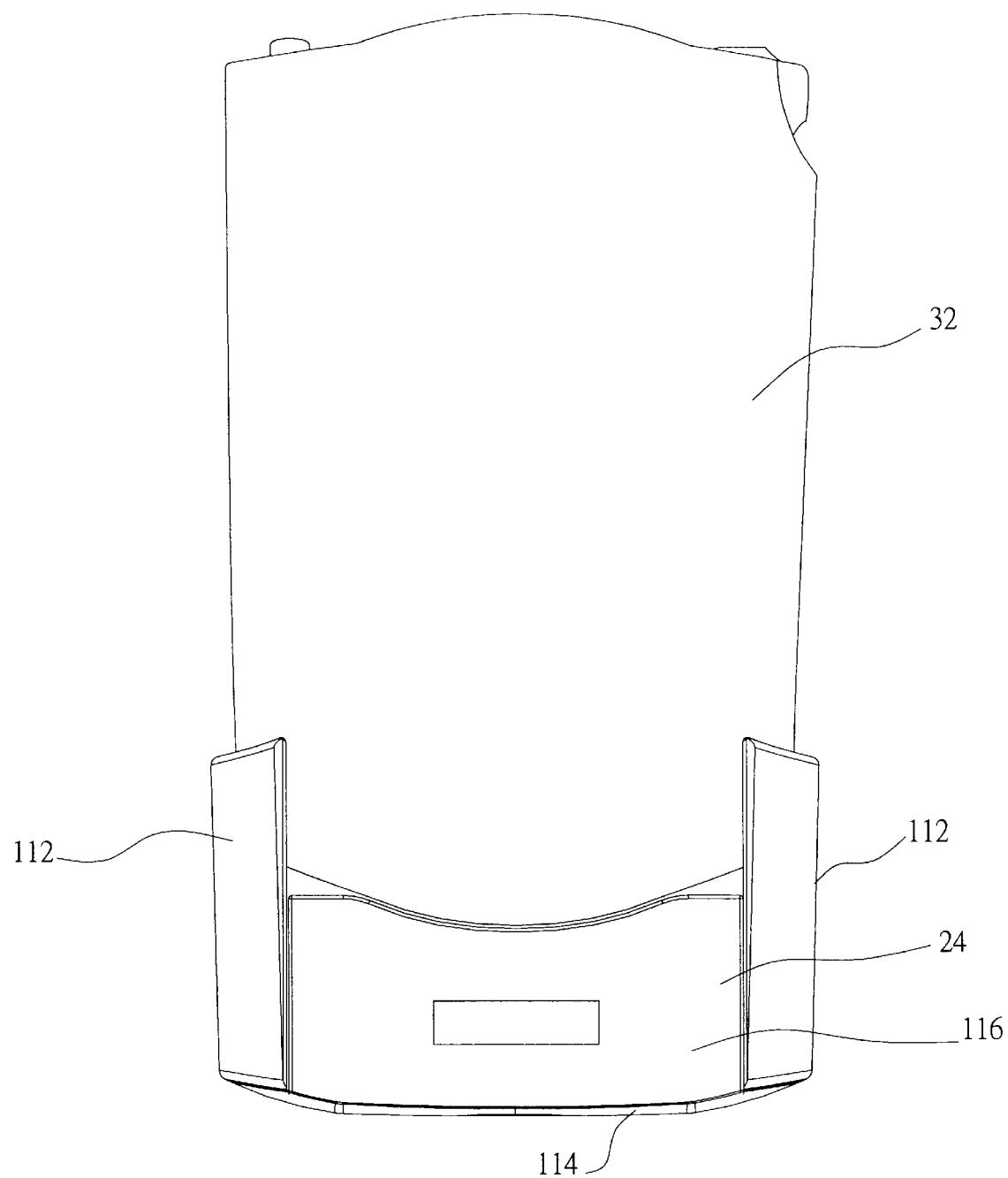

Referring now to FIGS. 2b and 6b, first space 21 may not be large enough to contain a second electrical device 32 that is larger than the first electrical device 31. Cap 116 may therefore be pushed by the second electrical device 32 to slide along the side portions 112 and toward the bottom plate 114 when the second electrical device 32 is inserted into the input apparatus. When cap 116 is pushed to a bottom position 24, as FIG. 2b shows, the original first space 21 may be extended to a second space 22 that is large enough for containing the second electrical device 32.

Figure 7:
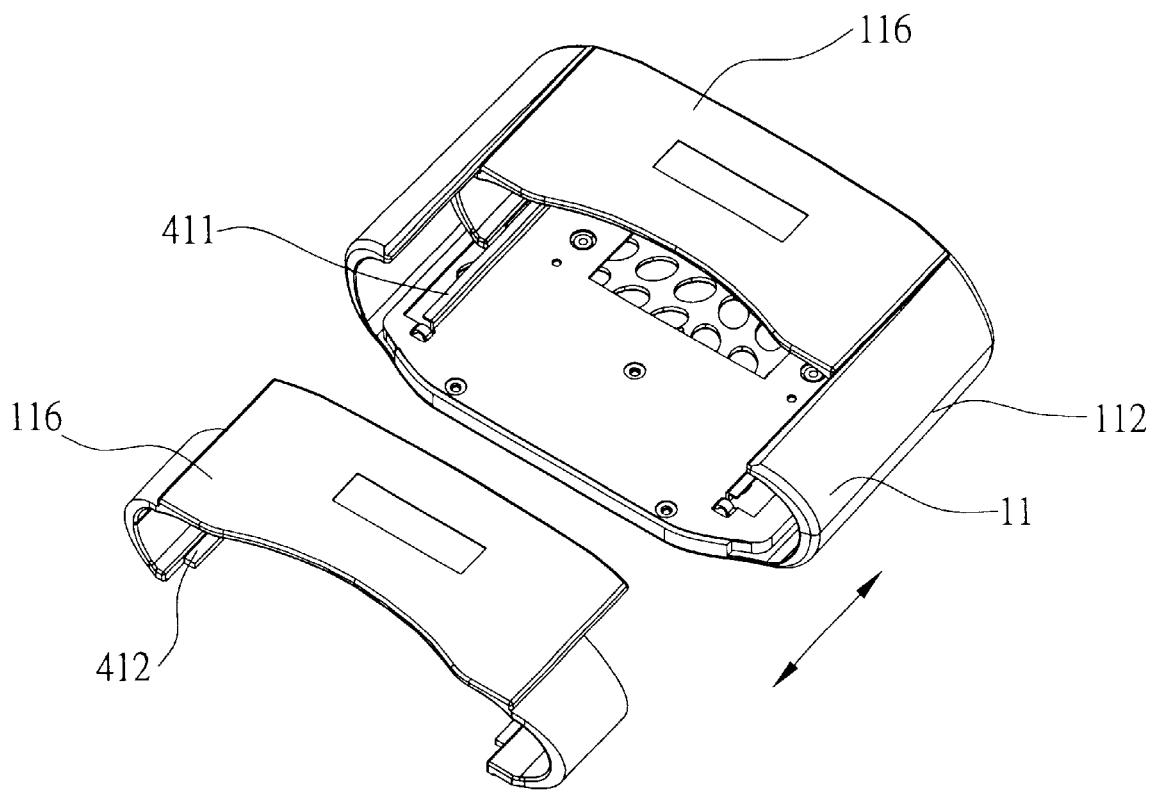
FIG. 7 depicts an exemplary embodiment of the first engagement structure and the second engagement structure.

Housing 11 suitably has a first engagement structure 411, and cap 116 has a second engagement structure 412, as FIGS. 2a, 2b, and 7 show. Cap 116 may move relative to the two side portions 112 without deviation due to the engagement between the first and second engagement structures 411, 412. In one embodiment, the engagement between the first and second engagement structures 411, 412 is a tongue-and-groove joint. However, the engagement alternatively include a combination of gears, tracks, and/or other structures.

Figure 5A:
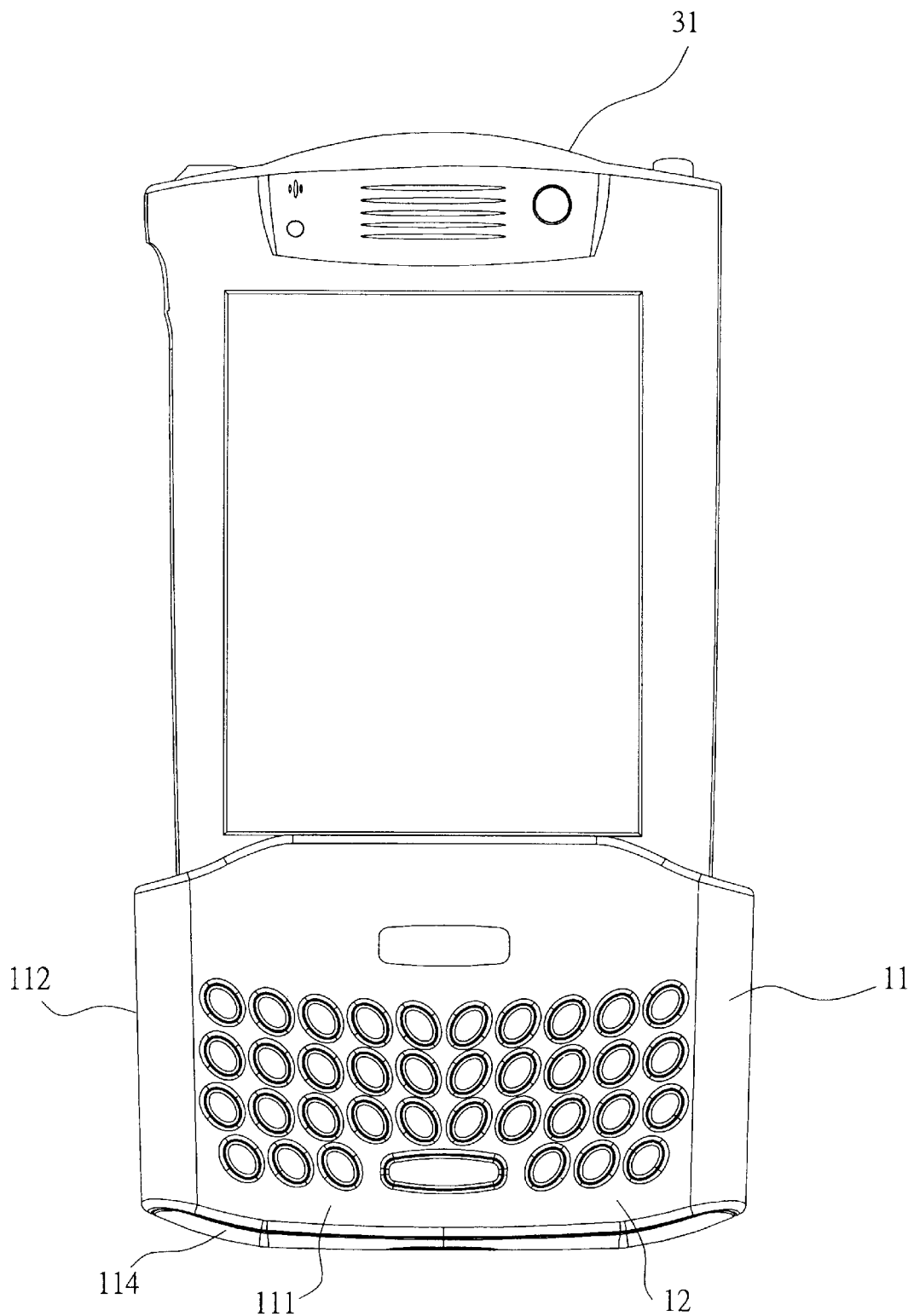
Figure 5B:
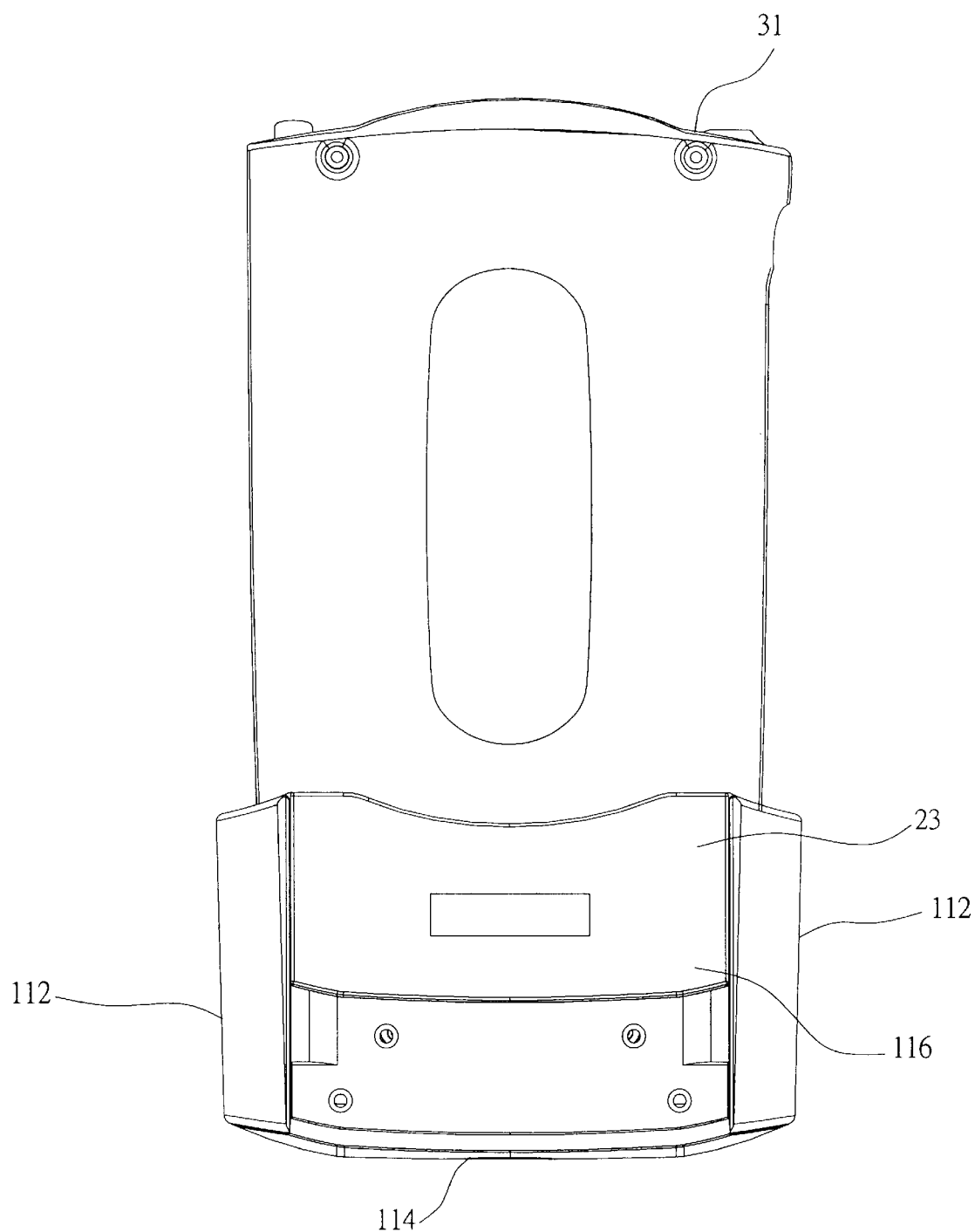

The input interface 12 is appropriately disposed on front plate 111, as shown in FIGS. 3a and 5a. The input interface 12 may be a keyboard, digital tablet, joystick, trackball, touchpad, and/or other input devices.

In a further embodiment, as FIG. 3a shows, input interface 12 is a keyboard. Some or all of the keys of the keyboard may be organized as a "Qwerty", Dvorak, foreign language, or other layout. Moreover, some keys of the keyboard other than the keys mentioned above may be assigned as function keys in accordance with users' requirement and design variations.

Figure 4A:
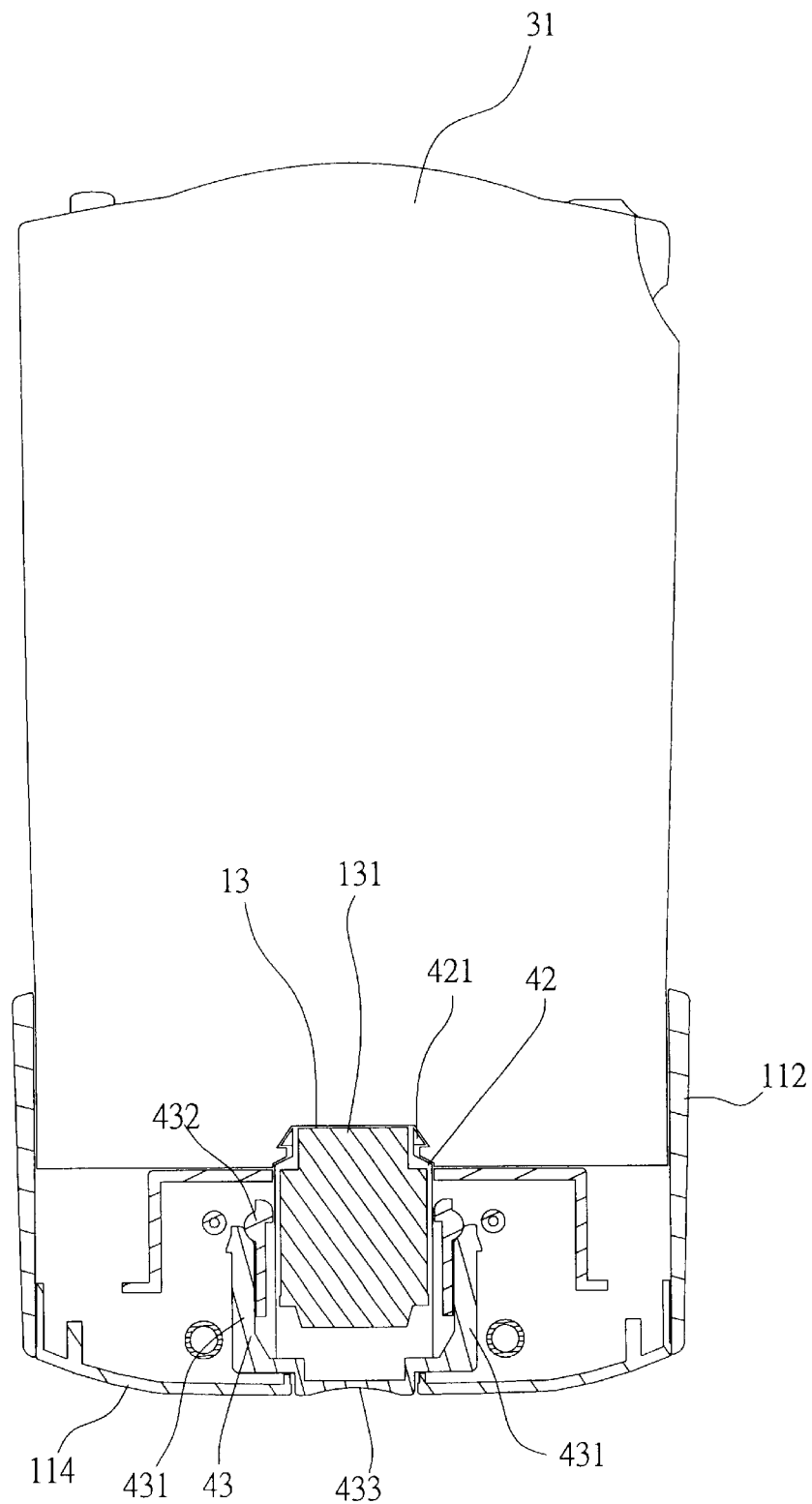
FIG. 4a is a profile of an exemplary embodiment with the input apparatus holding the first electrical device.

Referring now to FIGS. 2b, 3c, and 4a, the input apparatus further includes an interface 13 disposed within the housing 11 and electrically connected to the input interface 12. Interface 13 includes at least one connector 131 that may be an input/output connector (I/O) or other type of connector. When the first or second electrical devices 31, 32 cooperate with the input apparatus, the connector 131 may be electrically coupled to a socket of the first or second electrical devices 31, 32 to transmit a signal from the input interface 12 to the electrical device.

The input apparatus further includes a constraint device 42 for coupling the first or second electrical devices 31, 32 to the input apparatus electrically connects to the first or second electrical devices 31, 32, as FIG. 4a shows. The constraint device 42 may be a retainer, a magnet device, elastic device, and/or other structure.

The input apparatus may also include a release device 43 corresponding to the constraint device 42. The release device 43 connects to and controls the constraint device 42 to separate the input apparatus from the first or second electrical devices 31, 32. The release device 43 may be assembled from any convenient components, such as buttons, switches, and others, as well as connecting components such as springs, linkage bars, and others.

Figure 4B:
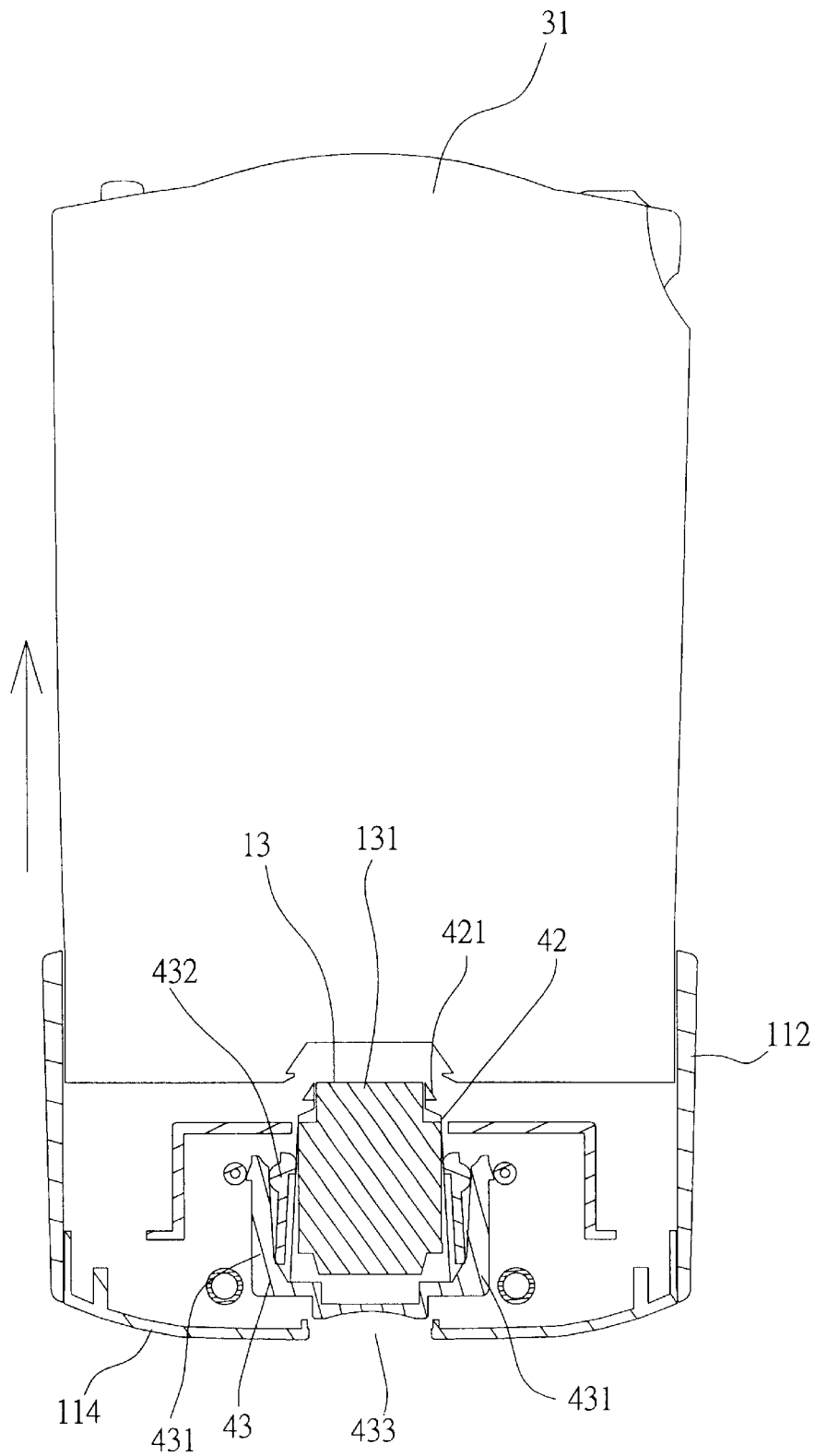
FIG. 4b is a profile of the embodiment shown in FIG. 4a with the retainer being released.

In the embodiment shown in FIG. 4a, the constraint device 42 is a retainer 421, which includes two latches disposed at two opposite edges of the connector 131. The release device 43 includes a first shaft 431, a second shaft 432, and a button 433. Button 433 is disposed on the bottom plate 114. One end of the first shaft 431 contacts with the second shaft 432, and the other end of the first shaft 431 is coupled to the button 433. The second shaft 432 also contacts with the latches of the retainer 421. When button 433 is pressed, as FIG. 4b shows, the first shaft 431 moves upward to press the second shaft 432 and retainer 421 inward, and the first or second electrical devices 31, 32 is released. In other words, the retainer 421 locks the first or second electrical devices 31, 32 when the first or second electrical devices 31, 32 is inserted into the input apparatus, as FIG. 4a shows. After input action, press the button 433 may release the retainer 421 and separate the electrical device from the input apparatus, as FIG. 4b shows.

FIGS. 5a and 5b show an exemplary embodiment that depicts cooperation of the input apparatus and the first electrical device 31. The first electrical device 31 mentioned herein may be a personal digital assistant (PDA). As FIG. 5b shows, cap 116 remains in the top position 23, and the first space 21 is retained.

FIGS. 6a and 6b show an embodiment of the cooperation between the input apparatus and the second electrical device 32, which has a larger size than first electrical device 31. The second electrical device 32 mentioned herein may be a PDA wrapped with a jacket, for example. As FIGS. 6a and 6b show, cap 116 is pushed to the bottom position 24 by the second electrical device 32, and the first space 21 is extended to the second space 32 to contain the second electrical device 32.

The above description sets forth various exemplary embodiments of the invention only, and is not intended to limit the scope, applicability, or configuration of the invention in any way. Rather, various changes may be made in the function and arrangement of the elements described in these embodiments without departing from the spirit and scope of the invention. Thus, the protected scope of the present invention is as set forth in the appended claims and their legal equivalents.

What is claimed is:

1. An input apparatus for selectively holding a first electrical device of a first size or a second electrical device of a second size larger than the first size, said input apparatus comprising:

a housing having a front plate, two side portions, and a bottom plate;

an input interface disposed on said front plate and selectively electrically connecting to one of said first electrical device and said second electrical device; and a cap slidably disposed between said two side portions, said cap being selectively positioned in a bottom position or a top position due to relative movement between said cap and said two side portions;

wherein said front plate and said cap define a first space for holding said first electrical device when said cap is positioned in said top position, said front plate and said two side portions define a second space larger than said first space for holding said second electrical device when said cap is positioned in said bottom position.

2. The input apparatus of claim 1, wherein said housing comprises a first engagement structure and said cap comprises a second engagement structure corresponding to said first engagement, and wherein the cap moves relative to the two side portions due to engagement between the first and second engagement structures.

3. The input apparatus of claim 1, wherein the input apparatus further comprises an interface disposed within the housing and electrically connecting to the input interface to electrically connect the input interface to either of the first electrical device and the second electrical device.

4. The input apparatus of claim 3, wherein the interface comprises a connector configured to mate with either of the first electrical device and the second electrical device.

5. The input apparatus of claim 4, wherein the input apparatus further comprises a constraint device and wherein, the constraint device holds either of the first electrical device or the second electrical device from separation when the input apparatus electrically connects to the first electrical device or the second electrical device.

6. The input apparatus of claim 5, wherein the input apparatus further comprises a release device coupled to the constraint device for releasing the first electrical device or the second electrical device from the connector.

7. The input apparatus of claim 6, wherein the release device is disposed on the bottom plate.

8. The input apparatus of claim 6, wherein the release device further comprises a button, a first shaft, and a second shaft, an end of the first shaft is coupled to the button, the first shaft contacts with the second shaft, the second shaft contacts with the constraint device, the first shaft presses the second shaft inward when depressing the button to push the first shaft, then the second shaft presses the constraint device to release the first electrical device or the second electrical device.

9. The input apparatus of claim 5, wherein the constraint device comprises a retainer.

10. The input apparatus of claim 9, wherein the retainer includes two latches disposed at two opposite edges of the connector.

11. The input apparatus of claim 4, wherein the connector comprises an I/O pins.

12. The input apparatus of claim 1, wherein the input interface comprises a keyboard including at least one key.

13. The input apparatus of claim 1, wherein the input interface comprises a joystick.

* * * * *